United States Patent [19]

Campbell et al.

[11] 4,380,353
[45] Apr. 19, 1983

[54] DUST CONTROL SYSTEM AND METHOD OF OPERATION

[75] Inventors: John A. L. Campbell, Mascoutah; Daniel J. Moynihan; William D. Roper, both of Belleville; Earl C. Willis, Benton all of Ill.

[73] Assignee: Peabody Coal Company, St. Louis, Mo.

[21] Appl. No.: 282,430

[22] Filed: Jul. 13, 1981

Related U.S. Application Data

[63] Continuation of Ser. No. 20,280, Mar. 14, 1979, abandoned.

[51] Int. Cl.³ .................. E21C 7/08; B01D 47/06
[52] U.S. Cl. .................................. 299/12; 299/64; 55/89; 55/90; 55/227; 55/229; 55/233; 55/242; 55/271; 55/212; 55/385 D; 55/467; 55/491; 55/501
[58] Field of Search ............... 55/90, 227, 229, 233, 55/242, 257 PV, 257 QV, 259, 271, 491, 501, 503, 514, 509, 526, DIG. 31, 212, 467, 440, 385 D, 89; 299/12, 18, 64–68; 285/184, 283

[56] References Cited

U.S. PATENT DOCUMENTS

| | | | |
|---|---|---|---|
| 1,037,424 | 9/1912 | Braemer | 55/257 PV |
| 1,965,866 | 7/1934 | Tolman, Jr. | 55/212 |
| 2,100,178 | 11/1937 | White | 299/12 |
| 2,404,479 | 7/1946 | Essick | 55/467 |
| 2,853,149 | 9/1958 | Gosselin | 55/227 |
| 2,911,011 | 11/1959 | Niehart | 55/257 PV |
| 3,111,489 | 11/1963 | Getzin | 55/503 |
| 3,132,015 | 5/1964 | O'Bryant | 55/491 |
| 3,258,848 | 7/1966 | Watlington | 285/283 |
| 3,325,973 | 6/1967 | Illingworth | 55/90 |
| 3,370,401 | 2/1968 | Lucas et al. | 55/90 |
| 3,387,889 | 6/1968 | Ziemba et al. | 296/12 |
| 3,646,728 | 3/1972 | Holler, Jr. | 55/233 |
| 3,667,193 | 6/1972 | McKenzie | 55/227 |
| 3,700,284 | 10/1972 | Agnew | 299/12 |
| 3,712,678 | 1/1973 | Amoroso | 299/68 |
| 3,792,568 | 2/1974 | Gundlach et al. | 299/12 |
| 3,810,677 | 5/1974 | David | 299/64 |
| 3,884,650 | 5/1975 | Deane | 55/467 |
| 3,977,977 | 8/1976 | Kall | 55/440 |
| 4,099,937 | 7/1978 | Ufken et al. | 55/271 |
| 4,175,933 | 11/1979 | James | 55/233 |
| 4,225,188 | 9/1980 | McGuire et al. | 55/257 PV |
| 4,289,509 | 9/1981 | Hölter | 55/257 PV |

FOREIGN PATENT DOCUMENTS

| | | | |
|---|---|---|---|
| 1049923 | 3/1979 | Canada | 55/259 |
| 1185001 | 7/1959 | France | 55/DIG. 31 |

OTHER PUBLICATIONS

Monters Euroform D-Mist-R, The Heat and Moisture Transfer Specialists.
Peabody's Respirable Dust Program, Peabody Coal Company, St. Louis, Missouri, Oct. 1976.

*Primary Examiner*—David L. Lacey
*Attorney, Agent, or Firm*—Senniger, Powers, Leavitt and Roedel

[57] ABSTRACT

A dust control system for a mining machine, particularly for controlling respirable dust in coal mining operations, comprising a ductwork system having intakes adjacent the cutter head of the mining machine, a fan for drawing air through the ductwork system, a flooded bed scrubber in the ductwork system upstream from the fan for entraining dust, including respirable dust, in the air in droplets of water, air flowing through the scrubber carrying the dust-laden droplets of water downstream from the scrubber, a sump below the ductwork system between the flooded bed scrubber and the fan, a demister in the ductwork system above the sump for separating the dust-laden droplets of water and directing them into the sump, and a pump for pumping the dust-laden water from the sump to a point adjacent the cutting head. A method of controlling dust is also disclosed.

23 Claims, 13 Drawing Figures

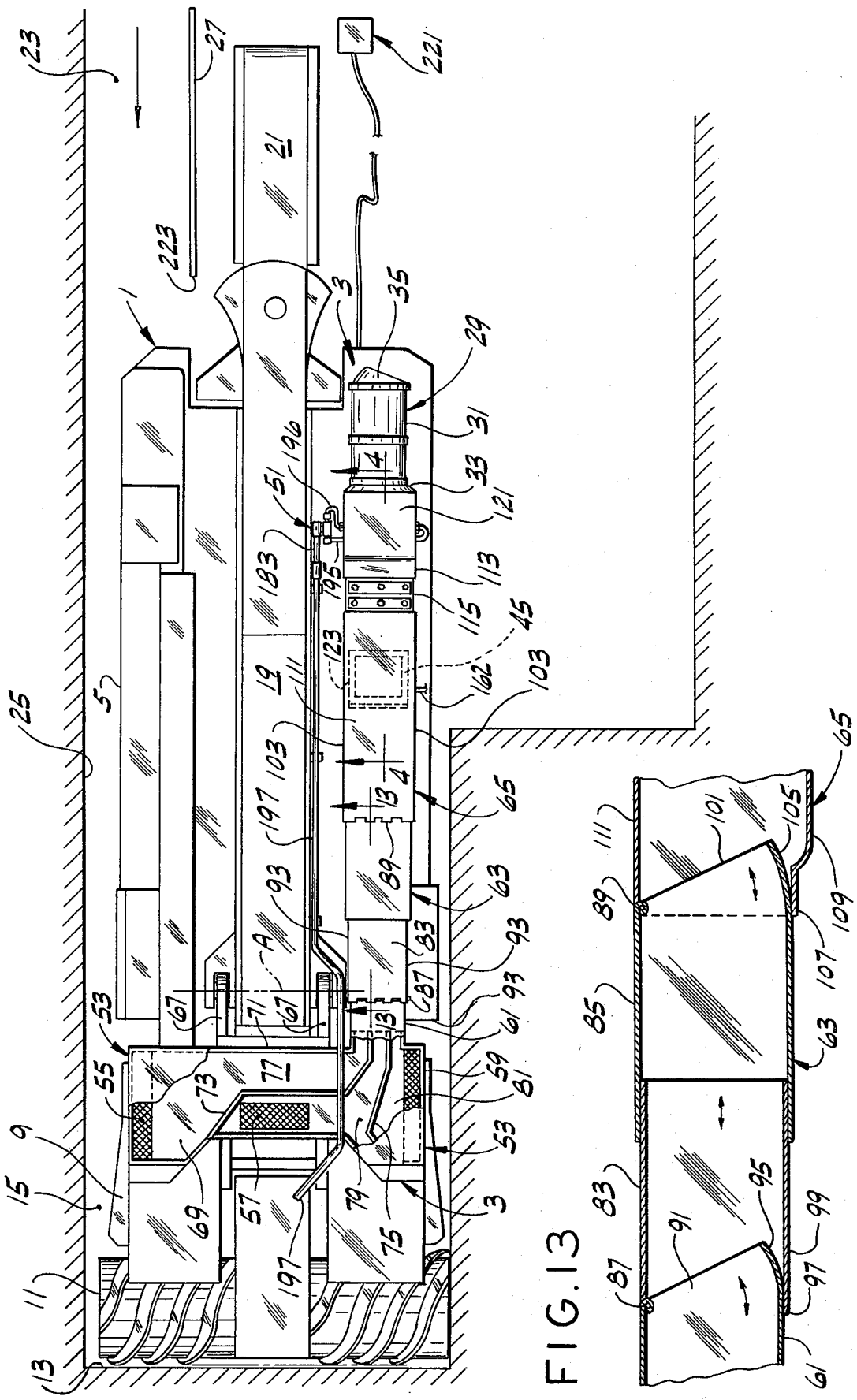

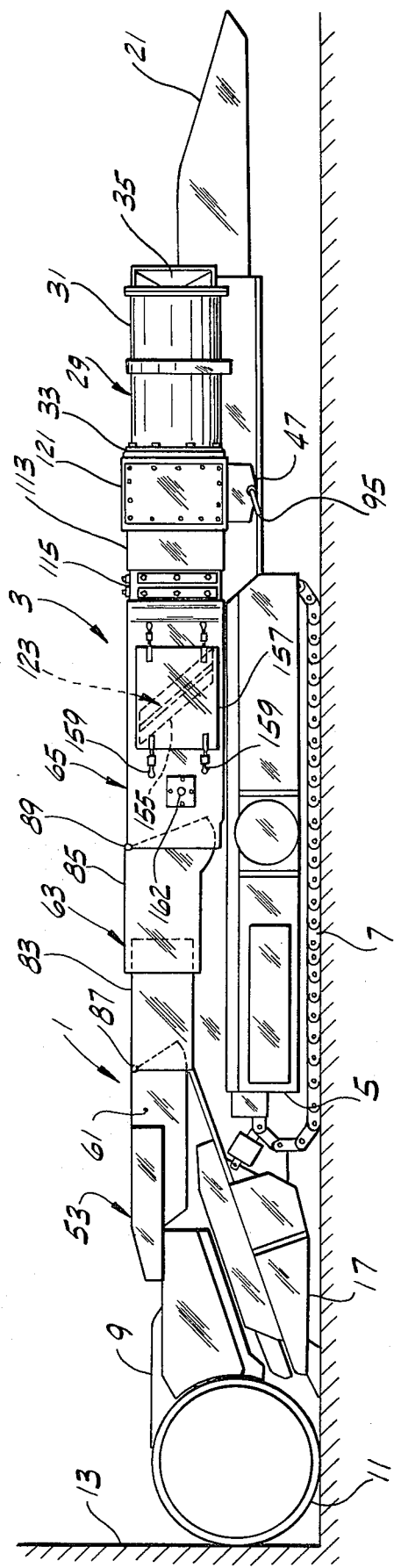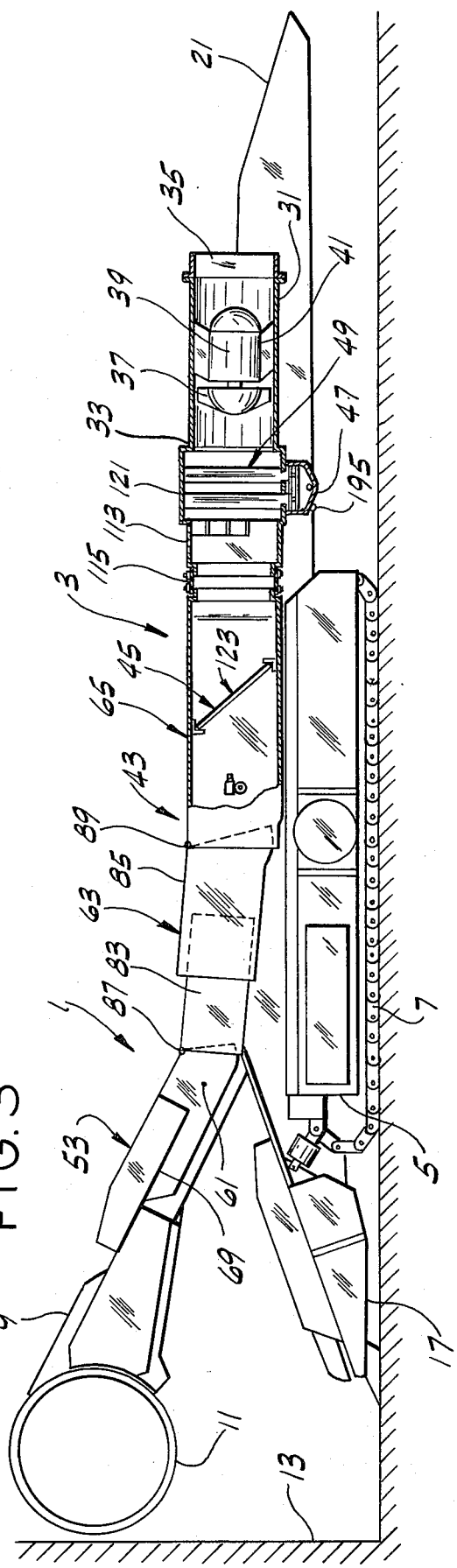

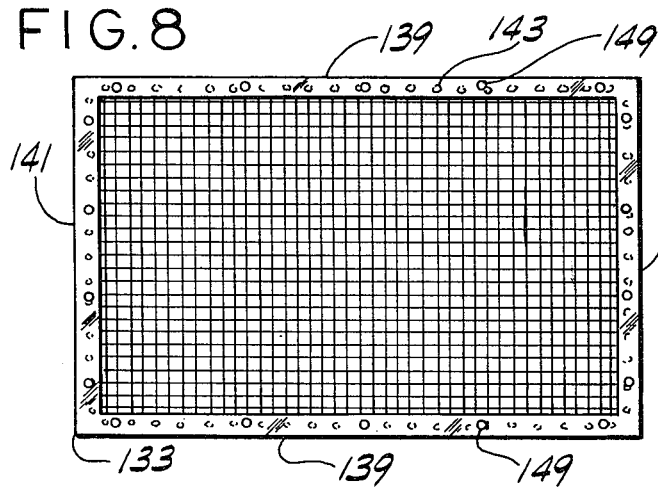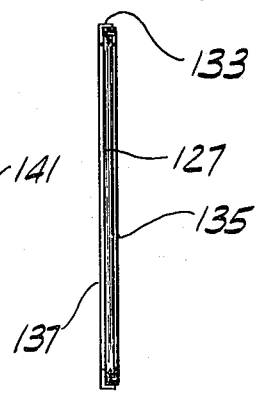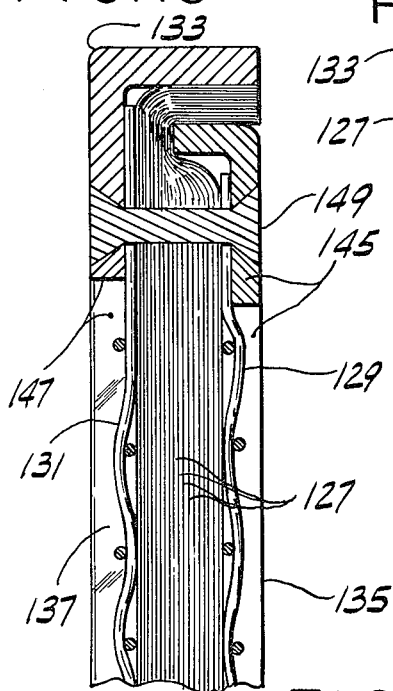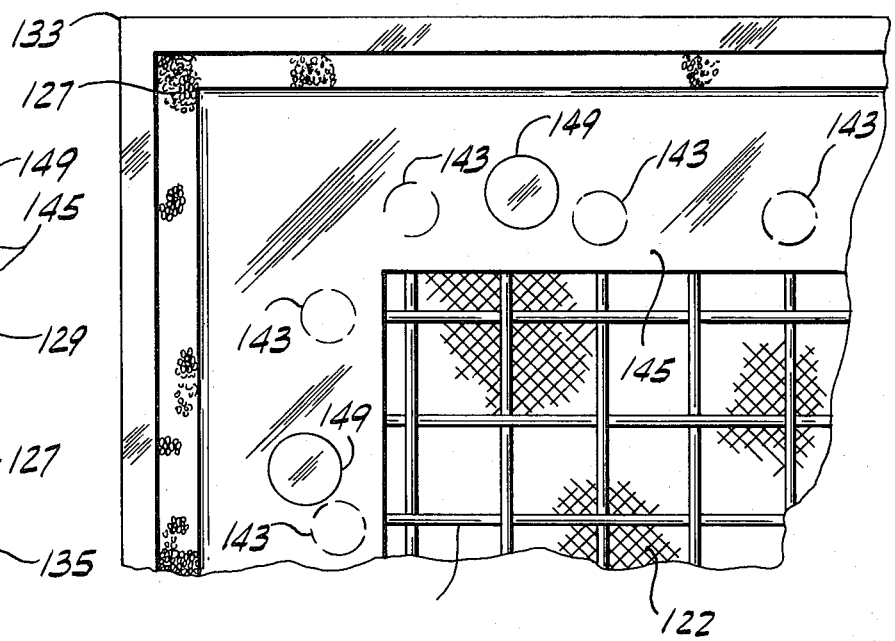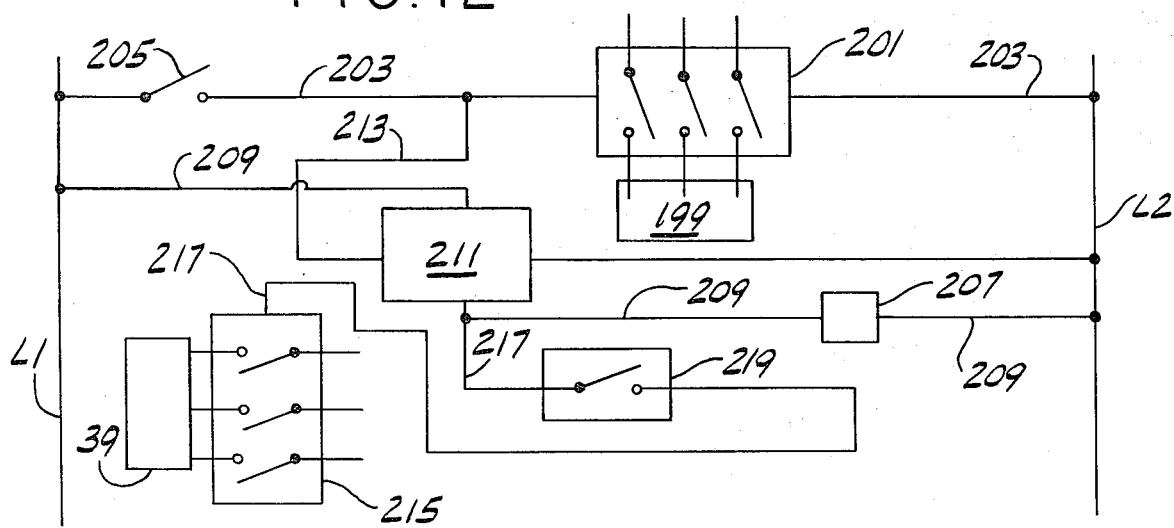

DUST CONTROL SYSTEM AND METHOD OF OPERATION

This is a continuation of application Ser. No. 020,280, filed Mar. 14, 1979, now abandoned.

BACKGROUND OF THE INVENTION

This invention relates to a dust control system, e.g., a system for controlling dust generated by the operation of a mining machine, and more particularly to such a system for controlling dust in underground coal mining operations.

The invention is especially concerned with the problem of removing dust from the air in a mine in the vicinity of equipment which, in use in the mine, generates dust. It is particularly concerned, for example, with the removal of dust from the air in the vicinity of the working face of a mine, and particularly a coal mine, generated by a mining machine such as a machine of the type referred to as a continuous miner, as a result of the cutter of the machine cutting into the working face. The dust includes particles of various sizes; this invention is particularly concerned with the removal from the air of what is generally referred to as "respirable dust", for compliance with government regulations relating to control of respirable dust, and in particular for compliance with the Federal 1969 Health and Safety Act which requires exposure to respirable dust levels to be below 2 milligrams per cubic meter for an eight hour work shift. It will be understood that respirable dust is fine-particle dust, generally comprising particles less than 5 microns in size, which may accumulate in a miner's lungs and cause pneumoconiosis. The problem of controlling dust, and especially respirable dust, is compounded when it is desired to use what is referred to as a blowing face mine ventilation system, which is a system in which air for ventilation at the working face in a mine entry is blown at relatively high velocity toward the working face between a side wall of the entry and a curtain extending generally parallel to said side wall. The blowing face system of ventilation is generally effective for ventilation but may cause dust problems, in contrast to the exhaust type of mine face ventilation (in which air is exhausted from the entry after delivery to the face at relatively low velocity) which is not as good for ventilation as the blowing face system, but which does not cause as much of a dust problem as the blowing face system.

SUMMARY OF THE INVENTION

Among the several objects of this invention may be noted the provision of an improved dust control system particularly adapted for use in conjunction with equipment such as mining equipment which in use generates dust; the provision of such a system for a mining machine adapted effectively to remove dust from the air in the vicinity of the working face in a mine where the cutter of the mining machine is cutting the material being mined and thereby creating dust; the provision of such a system which is adapted effectively to remove fine dust particles from the air, and particularly respirable dust to reduce health hazards to the miners working in the mine, especially the hazard of pneumoconiosis; the provision of such a system which is effective with various systems of mine ventilation, including blowing face ventilation systems, thus enabling effective respirable dust control along with good mine face ventilation; the provision of such a system which, while involving components of such relatively small size as to be capable of use on a mining machine in the limited confines of a mine passage, is capable of high air flow for effective removal of dust including respirable dust; the provision of such a system wherein the dust is effectively scrubbed from the air; the provision of such a system which requires relatively minor maintenance, which is relatively long-lived in use, and which operates with high air flow over extended periods of time, thus reducing down time; and the provision of such a system which efficiently disposes of the dust scrubbed from the air.

In general, a dust control system of this invention is particularly adapted for use in conjunction with equipment, such as mining equipment but it could also be tunneling equipment, which in use generates dust. From the apparatus standpoint, the system generally comprises a fan, means forming a passage for induced flow of air from adjacent the region where the equipment generates dust to the fan, and means in said passage means for scrubbing dust from the air flowing through said passage means. This scrubbing means comprises means for effecting entrainment in droplets of water of dust, including respirable dust, which is in the air as a result of operation of the equipment. Air flows through the scrubbing means and thence downstream from the scrubbing means in said passage means, the dust-laden droplets of water passing downstream from the scrubbing means in the air flowing downstream from the scrubbing means. A sump is associated with said passage means. Means is provided in said passage means between the scrubbing means and the fan for separating the dust-laden droplets of water from the air flowing through said passage means before the droplets reach the fan and diverting the dust-laden droplets of water into the sump, said dust-laden droplets flowing from said separating means into the sump, and means is provided for disposal of the dust-laden water collecting in the sump. From the method standpoint, the system generally comprises inducing the flow of dust-laden air through a passage away from the region where operation of the equipment generates dust, the flow being induced by operation of a fan to draw the dust-laden air through the passage, scrubbing dust from the air as it flows through said passage by entraining the dust, including respirable dust, in droplets of water, the dust-laden droplets of water flowing downstream throuhg said passage in the air flowing through said passage, separating the dust-laden droplets of water from the air flowing through said passage before the droplets reach the fan, whereby the fan operates in relatively droplet-free and dust-free air, and collecting and disposing of the dust-laden droplets.

Other objects and features will be in part apparent and in part pointed out hereinafter.

BRIEF DESCRIPTION OF THE DRAWINGS

FIG. 1 is a plan of a mining machine equipped with a dust control system of this invention, showing the machine in a mine passage with its cutter head at the working face of the passage, and showing a curtain for blowing face ventilation, part of the dust control system being broken away;

FIG. 2 is a side elevation of the mining machine showing the cutter boom of the machine in a lowered position;

FIG. 3 is a view similar to FIG. 2 showing the cutter boom in a raised position, also with parts broken away and shown in section;

FIG. 8 is a view in front elevation of the bed of a flooded bed scrubber used in the dust control system;

FIG. 9 is a vertical section of the scrubber bed;

FIG. 10 is an enlarged fragment of FIG. 9;

FIG. 11 is an enlarged fragment of FIG. 8;

FIG. 12 is a wiring diagram; and

FIG. 13 (sheet 1) is an enlarged section on line 13—13 of FIG. 1;

Corresponding reference characters indicate corresponding parts throughout the several views of the drawings.

DESCRIPTION OF THE PREFERRED EMBODIMENT

Figure 4:
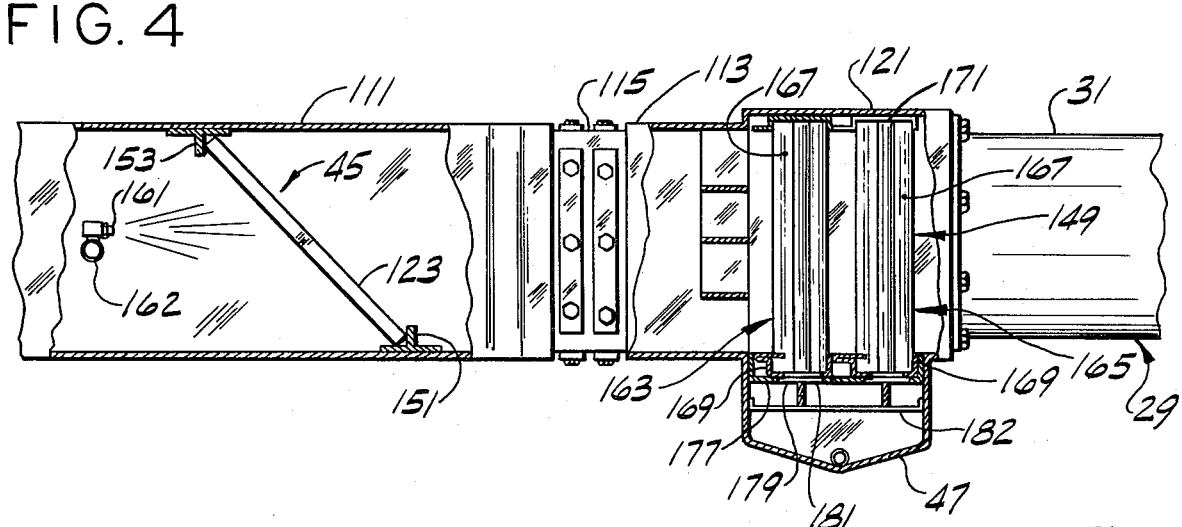
FIG. 4 is a side elevation, on a larger scale than FIGS. 2 and 3, showing part of the dust control system, with parts broken away and shown in section on line 4—4 of FIG. 1.
Figure 5:
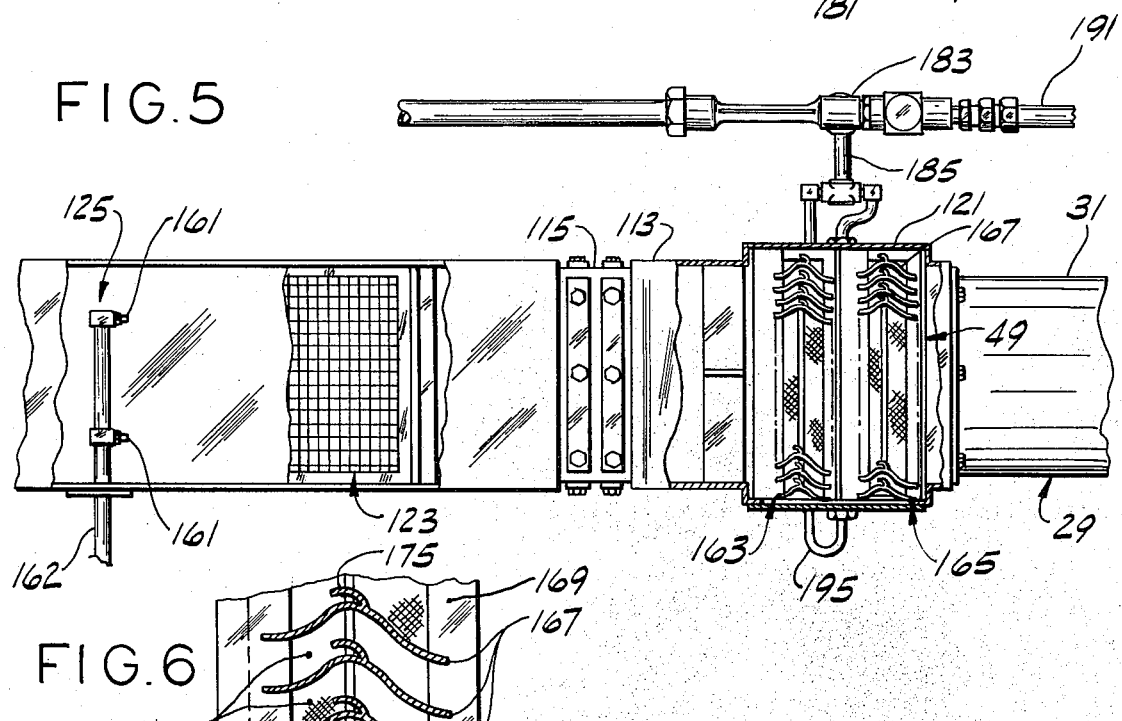
FIG. 5 is a plan of FIG. 4, with parts broken away and shown in section.
Figure 6:
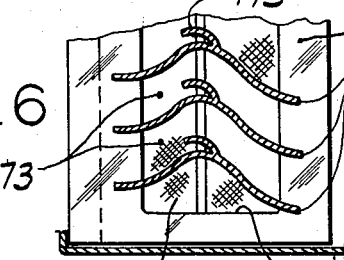
FIG. 6 is an enlarged fragment of FIG. 5.

Referring first to FIGS. 1-3 there is generally indicated at 1 a mining machine and at 3 a dust control system of this invention for the machine. The mining machine shown is a conventional commercially available continuous miner comprising a vehicle 5 on caterpillar treads 7. The machine has at one end constituting its forward end (its left end as shown in FIGS. 1-3) a cutter boom 9 pivoted for up and down swinging movement about an axis indicated at A in FIG. 1. The boom extends forward from the vehicle and carries at its forward end a cutting means, referred to as the cutter head 11, adapted to cut material to be mined, and more particularly coal, from the working face 13 of the mine entry or passage 15 in which the machine is being used. Also extending forward from the vehicle at its forward end, below the cutter boom, is an apron 17 on which coal cut from the working face 13 by the cutter head 11 is gathered and delivered to a conveyor 19 (see FIG. 1) which extends longitudinally of the vehicle 5 from the front to the rear of the vehicle with a rearward overhanging extension 21, for conveying coal back toward the rearward end of the vehicle and thence via extension 21 to a shuttle car (not shown), the coal falling off the rearward end of the conveyor into the car.

As shown in FIG. 1, ventilation is provided by blowing air toward the working face in a space indicated at 23 between one side wall 25 of the passage 15 (its right side wall as viewed in the direction toward the working face) and a curtain 27 hung to extend generally parallel to the side wall 25 and terminating short of the working face. It is noted that curtains or tubing can be used interchangably. This is the blowing face ventilation type of system referred to above. The dust control system 3 of this invention is well adapted for use with the blowing face ventilation system which, while providing good ventilation, has heretofore caused problems in respect to dust, and particularly respirable dust, generated by the cutting of coal at the working face.

The dust control system 3 comprises a fan 29 mounted on the vehicle 5; as herein illustrated the fan is mounted adjacent the left side of the vehicle and adjacent the rear end of the vehicle. The fan comprises a housing 31 having an inlet at 33 and an outlet at 35 and means 37 in the housing for causing a flow of air from the inlet to and out through the outlet. The preferred fan is a vane axial fan comprising a cylindrical housing 31 having an electric motor 39 mounted axially in the housing with space as indicated at 41 in FIG. 3 around the motor in the housing, the means 37 comprising vanes rotatable by the motor in the space to cause the flow of air. The fan is arranged on the vehicle with its axis extending generally longitudinally in respect to the vehicle and with its inlet 33 toward the forward end and its outlet 35 toward the rearward end of the vehicle. While a centrifugal fan has been successfully tested, the vane axial fan is preferred because it may be mounted in line with the air flow, whereas a centrifugal fan may require one or in some instances two sharp 90° turns. The elimination of these turns significantly reduces the overall static pressure requirements of the system. Also, it is possible to obtain relatively high rates of air flow with the vane axial fan with relatively high efficiency. For example, for a flow of 7000 CFM (cubic feet per minute) of air, as has been found desirable, operating at 16" of static pressure, a vane axial fan, which operates at 80% efficiency, requires only 22.8 horsepower for a 7000 CFM system, whereas a centrifugal fan, which operates at approximately 55% efficiency, requires 33.2 horsepower for a 7000 CFM system.

Indicated generally at 43 is means mounted on the vehicle forming a passage for induced flow of air from adjacent the cutter head 11 of the mining machine 1 to the inlet 33 of the fan housing 31. In this passage means 43 is means generally designated 45 for scrubbing dust from the air flowing through said passage means. This scrubbing means comprises means for effecting entrainment in droplets of water of dust, including respirable dust (particles of dust less than 5 microns in size), which is in the air as a result of the cutting of coal at the working face 13, air flowing through the scrubbing means and thence downstream from the scrubbing means (toward the right as viewed in FIGS. 1-4) in said passage means 43, and the dust-laden droplets of water passing downstream from the scrubbing means in the air flowing downstream from the scrubbing means.

A sump 47 is associated with the passage means 43 located below the passage means 43 between the scrubbing means 45 and the inlet 33 of the fan housing. Means indicated generally at 49 is provided in the passage means 43 above the sump for separating the dust-laden droplets of water from the air flowing through the passage means 43 before the droplets reach the fan and diverting the dust-laden droplets of water into the sump, the dust-laden droplets flowing down from the separating means 49 into the sump 47. This means 49 may be referred to as a mist eliminator or demister. Means indicated at 51 is provided for pumping to a place of disposal, and more particularly to a point adjacent the cutter head 11, the dust-laden water collecting in the sump.

The passage means 43 comprises a system of ductwork forming a passage for the induced flow of air from the vicinity of the forward end of the vehicle 5 to the inlet 33 of the fan housing 31. This ductwork system comprises an air intake section 53 associated with the cutter boom 9 and swingable up and down with the boom, having bottom inlet openings 55, 57 and 59 for upward flow of dust-laden air from below the boom into the air intake section. The latter has a rearwardly directed air outlet 61 at the left side of the vehicle 5, air flowing through this outlet 61 into a telescoping duct section 63 and thence into a fixed duct section 65 of the ductwork system extending longitudinally of the vehicle alongside the conveyor 19 at the left side of the vehicle from the air outlet 61 of the air intake section 53 to the inlet 33 of the fan housing 31. The scrubbing means 45 is located in the fixed duct section 65. The sump 47 is located below the fixed duct section 65 between the scrubbing means 45 and the inlet 33 of the fan housing 31. The demister 49 for separating the dust-laden droplets of water from the air is located in the fixed duct section 65 above the sump 47.

The cutter boom 9 comprises a pair of arms indicated at 67 in FIG. 1. The air intake section 53 comprises a relatively long shallow box structure extending transversely of these arms and projecting out to the left and to the right (as viewed in forward direction with respect to the vehicle) from the arms. The three air inlet openings 55, 57 and 59 are screened openings in the bottom 69 of the air intake box structure 53, opening 55 being at the right end and opening 59 being at the left end of the box structure extending in longitudinal direction with respect to the vehicle, opening 57 being centered at the forward side of the box structure extending in transverse direction with respect to the vehicle. The air outlet 61 of the air intake sections 53 comprises a relatively short duct member of generally square cross section extending rearwardly from the rear 71 of the air intake box structure adjacent the left end of the box structure. Partitions 73 and 75 in the box structure (see FIG. 1) divide the space in the box structure into three separate air passages 77, 79 and 81, passage 77 conducting air from inlet opening 55 to the outlet 61, passage 79 conducting air from inlet opening 57 to the outlet, and passage 81 conducting air from inlet opening 59 to the outlet. This separation of the air provides for more equal intake of air through the three inlet openings 55, 57 and 59 than would occur if there were no separation (in the latter case, more air would enter inlet opening 59, which is closest to the outlet 61, than would enter openings 55 and 57, and more air would enter opening 57 than opening 55).

The telescoping duct section 63 comprises a forward duct member 83 telescopically slidable in a rearward duct member 85. The forward duct member 83 is hinged as indicated at 87 at its forward upper edge to the rearward upper edge of the outlet 61 of the air intake section; and the rearward duct member 85 is hinged as indicated at 89 at its rearward upper edge to the forward upper edge of the fixed duct section 65. The outlet 61 of the air intake section 53 has side portions 91 at its rearward end slidable on the inside of the sides 93 of the forward duct member 83 and a curved bottom portion 95 (see FIG. 13) at its rearward end slidable on the forward edge 97 of the bottom 99 of the forward duct member maintaining an adequate air seal between outlet 61 and member 83 as the outlet 61 swings up and down with the cutter boom 9. The rearward duct member 85 of the telescoping duct section 63 has side portions 101 at its rearward end slidable on the inside of the sides 103 of the fixed duct section 65 at the forward end of the latter, and a curved bottom portion 105 (see FIG. 13) at its rearward end slidable on the forward edge 107 of the bottom 109 of the fixed duct section 65 maintaining an adequate air seal between member 85 and section 65 as member 85 swings up and down as a result of the cutter boom 9 swinging up and down.

The fixed duct section 65 comprises a forward duct member 111 and a rearward duct member 113 with a flexible coupling at 115 between these members, the rearward member having a rearward demister section 121. The fan housing 31 extends rearward from the rear of the demister section 121.

The scrubbing means 45 is a flooded bed scrubber (a scrubber based on the principles of U.S. Pat. No. 3,370,401 issued Feb. 27, 1968 entitled Process and Apparatus for Wet Scrub Removal of Dust and Mist from Gases) comprising a bed 123 (see FIGS. 1, 4, 5, 8 and 9) removably mounted in the forward member 111 of the fixed duct section 65 extending across this member 111, and means 125 for maintaining the bed wetted with water. The bed is generally of a foraminous nature, preferably comprising a plurality of layers 127 (see FIG. 10) of open-mesh material held between reinforcing screens 129 and 131 in an open rectangular frame structure 133 comprising a first open rectangular frame 135 inset in a second open rectangular frame 137. Preferably, each of the layers of open-mesh material is a layer of knitted wire cloth with the wire of such size and the mesh of the cloth such as to provide for collection of dust, including respirable dust, in the wetted bed 123, by inertial impaction of the dust particles on to the wetted wire surfaces. For this purpose, a bed comprising forty single layers 127 of wire cloth knitted of $3\frac{1}{2}$ mil diameter stainless steel wire (e.g., 304 stainless steel) with a density of 48 has been found highly effective for entrainment in droplets of water of the dust, including respirable dust down to a few tenths of a micron in diameter, from the dust-laden air which is flooded through the wetted and in effect fibrous (wire) bed (the bed being composed of wire fibers), hence the reference to the bed as a "flooded" bed. It will be understood that the "density" of knitted wire cloth is a measure used in the knitted wire cloth art, being ten times the number of courses of wire per inch in the knitted cloth. While the stated forty-layer knitted wire cloth bed has been found to be more than 99% efficient for capturing coal dust in the respirable particle size range, it has also been found not to cause an undue pressure drop at the required velocity across the bed 123 such as would reduce air flow below an amount suitable for removal of coal dust caused by operation of a continuous miner (particularly in conjunction with a blowing face ventilation system). This is because the wire bed is principally an open structure, e.g., approximately 98% voids.

Each of the two open rectangular frames 135 and 137 comprises sides 139 and ends 141 of angle iron stock, with the first frame 135 somewhat smaller than the second 137 and adapted to telescope loosely into the second. Each of the screens 129 and 131 is, for example, a piece of 2 mesh 1/16" diameter stainless steel wire screen. Screen 129 is spot welded, e.g., at every other wire as indicated at 143 to the inside of the inwardly extending legs 145 of the angle irons of the frame 135, and screen 131 is similarly spot welded to the inside of the inwardly extending legs 147 of the angle irons of the frame. The layers of knitted wire cloth (laid one on another) are sandwiched between the screens 129 and 131 of the frames 135 and 137 and the frames are secured together by rivets as indicated at 149 to hold the layers in place between the screens. The screens protect the mesh layers in addition to holding them from bowing out under the force of the air flowing through the bed 123. This is important; if the wire cloth layers 127 were to bow out, the wire cloth would expand, increasing the size of the interstices in the cloth and decreasing scrubbing efficiency. In making the bed 123, it is preferred to provide a folded pad of the layers of wire cloth overlapping the larger frame 137 (e.g., by about 2 inches) on all four sides, then to force the smaller frame 135 into the larger frame 137 securing the knitted wire cloth layers all around, then to clamp and rivet the frames together, and finally to trim off the excess knitted wire cloth. An advantage of this construction is that a damaged or plugged pad may be removed (the rivets being drilled out for separating the frames) and replaced at a fraction of the cost of a complete new bed.

The bed 123 is mounted in place in the forward duct member 111 of the fixed duct section 65 extending in an inclined position, inclined downwardly in the direction of air flow (which is from left to right in FIG. 4) from top to bottom, between retainers 151 and 153 secured on the inside of the top and bottom of the duct member 111. The bed 123 is inserted in the duct member 111 (and may be removed therefrom) through an opening 155 in the left side (the outer side) of the duct member 111, this opening being closed by a cover 157 held in place by quick-release clamps 159.

The means 125 for maintaining the bed 123 wetted with water comprises a plurality of spray nozzles 161 (two being shown) adapted to spray water on the upstream face of the bed (see FIG. 4). The nozzles are preferably adapted to spray water in a wide angle full square spray pattern so as at least substantially completely to wet the bed over its entire area (missed areas tend to become plugged with dust). The water is sprayed on the bed at a rate so related to the flow of air through the bed 123 as to effect the scrubbing of practically all or at least substantially all of the dust from the air via the entrainment of the dust in droplets of water as a result of the inertial impaction of the particles on the wetted wire fibers of the knitted wire cloth layers 127 in the bed, the dust-laden droplets of water being blown out of the bed and passing downstream from the bed in the air. In general, reasonable scrubbing efficiencies are achieved when water is sprayed on the bed at a rate of between 0.5 and 2.0 gallons per 1000 CFM (cubic feet per minute) of air scrubbed. The efficiency drops from over 95% at 1 gallon per 1000 CFM to about 89% at 0.5 gallon per 1000 CFM. For operation at 7000 CFM of air drawn through the system by the fan 29, 9.3 gallons of water per minute have been successfully used. Water is supplied to the nozzles 161 as indicated at 162.

The demister 49 acts to separate droplets of water from the air stream passing downstream from the scrubber bed 123, and thus separates the dust particles in the droplets from the air stream. In this respect, it will be observed that the scrubber bed 123 does not per se function to remove the dust particles from the air stream; it conditions them, by wetting them or entraining them in droplets of water, so that they may be removed from the air stream with the water in the demister. The latter comprises two sets 163 and 165 of vanes or louvers 167 extending generally vertically in the demister section 121 of the rearward fixed duct member 113. Each set comprises a plurality of the vanes 167 extending side-by-side and parallel to one another secured at their lower ends to a base plate 169 and at their upper ends to a head plate 171. The vanes in each set are curved in the direction of the flow of air, forming curved air passageways 173 between the vanes, each vane having means constituted by a hook-shaped rib 175 extending lengthwise thereof (meaning heightwise in the demister section 121 of the fixed duct member 113) for trapping dust-laden (or other) droplets of water (mist) from the air as the air flows through the curved air passageways 173 between the vanes. The two sets 163 and 165 of vanes are mounted in place in the demister section 121 extending vertically and transversely of section 121 (see FIGS. 4 and 5), the base plates 169 of the two sets bearing on the bottom 177 of section 121. The base plate of each set has an opening 179 in register with an opening 181 in the bottom of section 121 for drainage of water caught in the hooks 175 on the vanes 167 down into the sump 47 located underneath section 121. A screen for the sump is indicated at 182.

Figure 7:
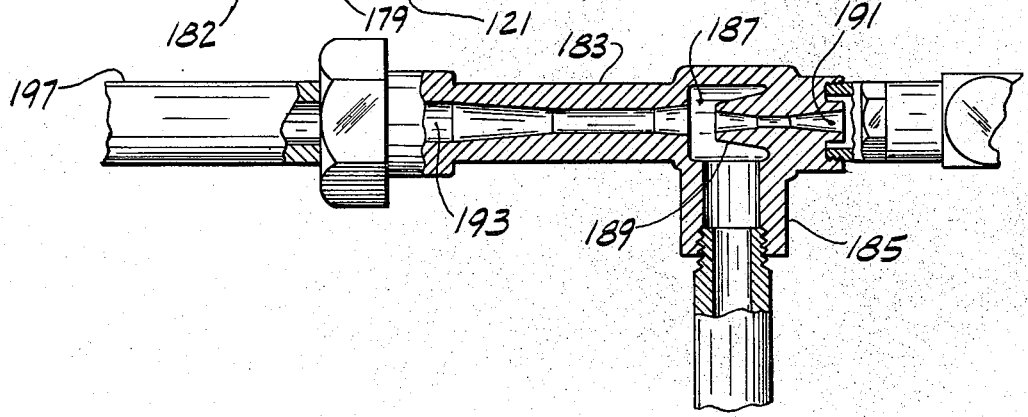
FIG. 7 is a detail of a pump used in the dust control system.

The means 51 for pumping the dust-laden water collecting in the sump 47 to a place of disposal comprises a pump 183 of a type operable to pump water with subatmospheric pressure on the water at the inlet of the pump, preferably a jet pump (see FIG. 7) of the type having an inlet 185 for the water to be pumped in communication with a suction chamber 187, and a venturi nozzle 189 for ejecting a stream of water entering at 191 into the suction chamber to draw water through the inlet 185 and discharge it through an outlet 193. Dust-laden water is fed from the sump 47 to the inlet 185 of the jet pump via lines 195 and 196. A conduit constituted by a hydraulic hose 197 extends from the outlet 193 of the jet pump along the left side of the mining machine to a point adjacent the cutter head 11 for delivery of the dust-laden water pumped from the sump 47 by pump 183 to a point adjacent the cutter head. It is presently preferred that the water be discharged onto the top of the cutter head. In one dust control system which has been tested, the total discharge from the hose 197 has been about 15 gallons of water per minute, of which about 9 gallons is dust-laden water from the sump and about 6 gallons is pump-operating water from the nozzle 189 of the pump. It is to be noted that with the flow of air (and at a relatively high rate, e.g., 7000 CFM) through the demister section 121 of the ductwork system, the sump 47 is under negative pressure and hence a positive displacement pump such as the jet pump 183 is used positively to pump water out of the sump.

As shown in FIG. 12, the motor 199 for driving the cutter head 11 is under control of a normally open relay 201 which is connected across power lines L1 and L2 as indicated at 203 in series with a cutter head motor switch 205, the arrangement being such that on closing switch 205, the relay is energized to close and energizes the cutter head motor. At 207 is indicated a solenoid valve means controlling the supply of water to the scrubber nozzles 161 and to the jet pump 183. This valve means, which is normally closed, is connected as indicated at 209 across lines L1 and L2 in series with a normally open time delay relay 211. The latter is interconnected as indicated at 213 with the cutter head motor switch 205 and is adapted to close with a delay of 2–5 seconds, for example, on closure of switch 205, and to open with a delay of 15–30 seconds, for example, on opening switch 205. The fan motor 39 is under control of a normally open relay 215 connected in series as indicated at 217 with the time delay relay 211 and a pressure switch 219 which is responsive to water pressure in the water line to the scrubber nozzles 161.

In the operation of the mining machine 1 with the dust control system 3, whenever the cutter head motor switch 205 is closed to operate the cutter head 11, relay 201 is immediately energized to start the cutter head motor 199. After a short time delay (e.g., 2–5 seconds) relay 211 closes. This results in energization of solenoid valve means 207 to deliver water to the scrubber nozzles 161 and to the jet pump 183, provided there is water under pressure available for the scrubber nozzles 161 as determined by the pressure switch 219, and also in energization of relay 215 to operate the fan motor 39.

With the fan 29 in operation, air is drawn into the passage means or ductwork system 43 through the screened downwardly-opening inlets 55, 57 and 59 of the air intake section 53, and flows back through the outlet 61 of section 53, the telescoping duct section 63 and the fixed duct section 65, exiting back into the mine passage 15 through the outlet 35 of the fan at the rear of the mining machine. The exit velocity of the air from the fan (or fan discharge ducting) should be low enough to avoid establishment of a secondary dust source. Dust particles below a certain size or mass, including respirable dust, generated by the operation of the cutter head 11 is entrained in the air entering the ductwork system through the screened inlet openings, and flows back with the air. In flowing back in the air through the system 43, the dust encounters the bed 123 of the flooded bed scrubber 45 (in the duct member 111), and is entrained in droplets of water as the air flows through the bed. The dust-laden droplets of water are blown downstream from the bed and encounter the demister 49 in the demister section 121 of the ductwork system, the demister functioning to separate the dust-laden droplets from the air and divert them down into the sump 47. The dust-laden water collected in the sump is pumped out of the sump by the jet pump 183 which is operable even though there is a negative pressure on the water in the sump. The dust-laden water is delivered via the hose 197 onto the top of the cutter head 11. Being wet, the dust is settled and does not become again entrained in the air in the vicinity of the working face, enabling it to be carried away with mined coal.

When the switch 205 is opened to stop the operation of the cutter head 11, the time delay relay 211 holds the circuit 217 for the relay 215 and the circuit 209 for the solenoid valve means 207 closed for the delay interval of relay 211 (e.g., 15–30 seconds) to dispose of the cloud of dust that would otherwise remain and be caused to flow back to the rear of the mining machine by the blowing face ventilation system. After the cloud has been cleared, relay 211 opens and cuts off the solenoid valve means 207, and cuts off the relay 215 to stop the fan 29. If water is not available for the scrubber 45 and the jet pump 183, as determined by the pressure switch 219, the fan 29 is kept out of operation to avoid plugging up the system with dust.

For efficient dust removal, the system should be operated with a relatively high air flow rate, e.g., 4500–8000 cubic feet per minute for a seam of coal four to six feet thick. Higher volumes may be required for thicker seams. The system is such that it may be built to operate at such a rate, even in the confined space permitted by reason of the size of the mining machine and the limited space in the mine in which the machine operates. The superficial velocity of the air flowing through the bed ("superficial" relating to the volumetric rate of flow per minute divided by the area of the face of the bed) may be about 1500–3000 feet per minute and is preferably about 2000–2500 feet per minute. The location of the inlets 55, 57 and 59 as shown in FIG. 1, in conjunction with the high air flow rate, is such that the dust, including respirable dust, generated by the operation of the cutter head 11 of the mining machine at the working face 13 is successfully collected, without any undue loss of collection of dust on account of blowing face ventilation air flow. With the inlets 55, 57 and 59 directed downwardly, material thrown back by the cutter head 11 must generally make a sharp turn to enter the inlets. The mass of most particles is too great to permit such a sharp turn, thus only relatively small particles enter the ductwork system 43. The larger particles generally do not present any health hazard, so their exclusion from the ductwork system is not disadvantageous. Instead, it is a distinct advantage in that it reduces the amount of dust that needs to be scrubbed from the air. It will be observed that the dust and water are generally wholly removed before they reach the fan 29, meaning that fan problems associated with handling wet and dirty air (e.g., increased maintenance, shortened life, loss of aerodynamic efficiency) are minimized. The telescoping duct section 63 accommodates the raising and lowering of the cutter boom 9, and stands up in service in a mine, as distinguished from fabric-type joints which have been found not to be mine-worthy. It will be understood that suitable clean-out panels (not shown) may be provided for the ductwork system, particularly for the air intake section 53.

A very significant advantage of the dust collection system of this invention is that it permits the use of a blowing face ventilation system (the latter providing good ventilation at the working face of a mine entry) and, not only that, with the addition of remote control for the mining machine 1 as indicated at 221 in FIG. 1, the machine may be operated from a point rearward of the end 223 of the curtain 27 used for blowing face ventilation, enabling deeper penetration into the working face, e.g., in excess of forty feet whereas heretofore the limit was ten feet with exhaust ventilation, without having to stop operations to change the curtain. The system may, of course, be used with the exhaust face ventilation system.

The control system of this invention has been particularly developed, as herein disclosed, for a continuous miner, e.g., the machine comprising vehicle 5 having boom 9 carrying cutter head 11. It is contemplated, however, that it may be used in association with other types of equipment whether surface of underground, including not only equipment which cuts or otherwise breaks coal (or other material) away from a working face or wall (e.g., so-called short wall and long wall mining machines, dinting machines, slot machines, boring machines, augers and road headers), but also equipment without cutting or breaking means (e.g., equipment which gathers coal mined by conventional methods and loads it into shuttle cars, and other coal conveying equipment). It is further contemplated that, as used on a mining machine or the like, different dispositions of the system on the machine may be used, with particular attention to minimizing the overall height of the machine with the system. In this regard, existing structure of the present machines may be utilized as a component or components of the system.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A machine comprising a vehicle having at one end constituting its forward end a boom pivoted for up and down swinging movement about an axis extending transversely of the vehicle and extending forward from the vehicle, a cutter head carried by the boom, and means for carrying away material cut by the cutter head comprising a conveyor extending longitudinally of the vehicle for conveying the material back toward the rearward end of the vehicle, said cutter head when operated to cut causing dust to be present in the air at the forward end of the vehicle, which dust may include particles in the size range below 5 microns, and a dust control system for said machine comprising:

a fan mounted on the vehicle adjacent one side of the vehicle alongside the conveyor toward the rearward end of the vehicle, said fan comprising a housing having an inlet and an outlet and means in the housing for causing a flow of air from the inlet to and out through the outlet;

a system of ductwork forming a passage for induced flow of air from the vicinity of the forward end of the vehicle to the inlet of the fan housing, said ductwork system comprising an air intake section associated with the boom and swingable up and down with the boom, said air intake section having bottom inlet openings for upward flow of dust-laden air from below the boom into said air intake section, and having an air outlet at its rear at said one side of the vehicle, said ductwork system further comprising a telescoping duct section and a fixed duct section extending longitudinally of the vehicle alongside said conveyor adjacent said one side of the vehicle from said air outlet of said air intake section to the inlet of said fan housing, said telescoping section being hinged at its forward end to said air outlet of said air intake section and hinged at its rearward end to the forward end of said fixed duct section;

a flooded bed scrubber in said fixed duct section for effecting entrainment in droplets of water of dust, including respirable dust in said range, which is in the air flowing through said fixed duct section as a result of the cutting of the material, said flooded bed scrubber comprising a bed of fibers extending across said fixed duct section through which the air may flow, and means for maintaining the fibers of said bed wetted with water, for entrainment in droplets of water of dust including respirable dust in said range by inertial impaction of the dust on the wetted fibers of the bed on drawing air through the bed at a sufficiently high velocity for said inertial impaction, the fan having the capacity for drawing the air through the bed at such velocity, the dust-laden droplets passing through the bed and downstream from the bed in the air flowing through said fixed duct section;

means in the fixed duct section between the bed and the inlet of the fan housing for separating the dust-laden droplets of water from the air flowing through the fixed duct section before the droplets reach the fan, said separating means being constructed and arranged for downward flow of the dust-laden droplets;

said fixed duct section having a bottom exit at the separating means for drainage of the dust-laden water therefrom;

a sump on the vehicle below said exit for receiving the dust-laden water; and means for pumping to a place of disposal the dust-laden water collecting in the sump.

2. A machine as set forth in claim 1 wherein said separating means comprises a plurality of vanes extending generally vertically in said fixed duct section above the sump, said vanes being curved in the direction of the flow of air, forming curved air passageways between the vanes, and having means extending lengthwise thereof and heightwise of said fixed duct section for trapping dust-laden droplets of water from the air as the air flows through the curved air passageways between the vanes, the water with the dust therein flowing down the trapping means of the vanes and flowing down off the lower ends of the vanes and out of said fixed duct section into the sump below the passage means.

3. A machine as set forth in claim 1 wherein the pumping means is a positive displacement pump constructed and arranged to pump water with subatmospheric pressure on the water at the inlet of the pump for pumping dust-laden water out of the sump.

4. A machine as set forth in claim 3 wherein a conduit extends from the outlet of the pumping means to adjacent the cutting means for delivery of dust-laden water from the sump to adjacent the cutting means.

5. A machine as set forth in claim 1 wherein the bed of the flooded bed scrubber comprises a plurality of layers of open-mesh material and the means for maintaining the fibers of said bed wetted with water comprises spray nozzles on the upstream side of the bed directed to spray water toward the bed.

6. A machine as set forth in claim 5 wherein the bed comprises a first open frame having a reinforcing screen therein and a second open frame having a reinforcing screen therein, the layers of open-mesh material being sandwiched between the screens of the frames and the frames being secured together to hold the layers in place between the screens, the layers being thereby held from bowing out.

7. A machine as set forth in claim 5 wherein the open-mesh material of each of said layers is knitted wire cloth knitted of stainless steel wire of about $3\frac{1}{2}$ mil diameter to a density of about 48, the bed comprising about 40 layers of said cloth.

8. A machine comprising a vehicle; means at one end of the vehicle, constituting its forward end, for operation on material to be removed, the operation of said means being such as to cause dust to be present in the air at said forward end of the vehicle, which dust may include respirable dust comprising particles in the size range below 5 microns; and a dust control system for said machine comprising:

a fan mounted on the vehicle spaced back from the forward end of the machine, said fan having an inlet and an outlet and means for causing a flow of air from the inlet to and out through the outlet; means on the vehicle forming a passage for induced flow of air from adjacent the forward end of the vehicle where dust is in the air to the inlet of the fan;

a flooded bed scrubber in said passage means for effecting entrainment in droplets of water of dust, including respirable dust in said range, which is in the air flowing through said passage means, said flooded bed scrubber comprising a bed of fibers extending across said passage means through which the air may flow, and means for maintaining the fibers of said bed wetted with water, for entrainment in droplets of water of dust including respirable dust in said range by inertial impaction of the dust on the wetted fibers of the bed on drawing air through the bed at a sufficiently high velocity for said inertial impaction, the fan having the capacity for drawing the air through the bed at such velocity, the dust-laden droplets passing through the bed and downstream from the bed in the air flowing through said passage means;

means for automatically maintaining the fan and means for maintaining the fibers of said bed wetted with water in operation for an interval on stopping the equipment;

means in said passage means between the bed and the inlet of the fan for separating the dust-laden droplets of water from the air flowing through said passage means before the droplets reach the fan, said separating means being constructed and arranged for downward flow of the dust-laden droplets;

a drainage system for the dust-laden droplets of water flowing down from said separating means comprising a sump on the vehicle below said separating means for receiving the dust-laden water; and means for disposal of the dust-laden water collected in the sump.

9. A machine as set forth in claim 8 further including means for automatically holding the fan out of operation if water is not available for the means for maintaining the fibers of said bed wetted with water.

10. A machine comprising a vehicle having at one end constituting its forward end a boom pivoted for up and down swinging movement about an axis extending transversely of the vehicle and extending forward from the vehicle, a cutter head carried by the boom, and means for carrying away material cut by the cutter head comprising a conveyor extending longitudinally of the vehicle for conveying the material back toward the rearward end of the vehicle, said cutter head when operated to cut causing dust to be present in the air at the forward end of the vehicle, which dust may include particles in the size range below 5 microns, and a dust control system for said machine comprising:

a fan mounted on the vehicle adjacent one side of the vehicle alongside the conveyor toward the rearward end of the vehicle, said fan comprising a housing having an inlet and an outlet and means in the housing for causing a flow of air from the inlet to and out through the outlet;

a system of ductwork forming a passage for induced flow of air from the vicinity of the forward end of the vehicle to the inlet of the fan housing, said ductwork system comprising an air intake section associated with the boom and swingable up and down with the boom, said air intake section having bottom inlet openings for upward flow of dust-laden air from below the boom into said air intake section, and having an air outlet at its rear at said one side of the vehicle, said ductwork system further comprising a telescoping duct section and a fixed duct section extending longitudinally of the vehicle alongside said conveyor adjacent said one side of the vehicle from said air outlet of said air intake section to the inlet of said fan housing, said telescoping section being hinged at its forward end to said air outlet of said air intake section and hinged at its rearward end to the forward end of said fixed duct section;

a flooded bed scrubber in said fixed duct section for effecting entrainment in droplets of water of dust, including respirable dust in said range, which is in the air flowing through said fixed duct section as a result of the cutting of the material, said flooded bed scrubber comprising a bed of fibers extending across said fixed duct section through which the air may flow, and means for maintaining the fibers of said bed wetted with water, for entrainment in droplets of water of dust including respirable dust in said range by inertial impaction of the dust on the wetted fibers of the bed on drawing air through the bed at a sufficiently high velocity for said inertial impaction, the fan having the capacity for drawing the air through the bed at such velocity, the dust-laden droplets passing through the bed and downstream from the bed in the air flowing through said fixed duct section;

means for automatically maintaining the fan and, means for maintaining the fibers of said bed wetted with water in operation for an interval on stopping the cutting means;

means for automatically holding the fan out of operation if water is not available for said means for maintaining the fiber of said bed wetted with water;

means in the fixed duct section between the bed and the inlet of the fan housing for separating the dust-laden droplets of water from the air flowing through the fixed duct section before the droplets reach the fan, said separating means being constructed and arranged for downward flow of the dust-laden droplets;

said fixed duct section having a bottom exit at the separating means for drainage of the dust-laden water therefrom;

a sump on the vehicle below said exit for receiving the dust-laden water; and means for pumping to a place of disposal the dust-laden water collecting in the sump.

11. A method of controlling dust generated by operation of equipment in an entry of a coal mine wherein the equipment is operated at the working face of the entry and its operation generates dust which may include respirable dust in the size range below 5 microns at said face, comprising:

passing dust-laden air from said face through a dust control system comprising a passage and a fan, the flow being from the face through the passage to the fan, and being induced by operation of the fan to draw the dust-laden air through the passage, scrubbing dust from the air as it flows through said passage by entraining the dust, including said respirable dust in the size range below 5 microns, in droplets of water, the dust-laden droplets of water flowing downstream through said passage in the air flowing through said passage, separating the dust-laden droplets of water from the air flowing through said passage before the droplets reach the fan, whereby the fan operates in relatively droplet-free and dust-free air, and collecting and disposing of the dust-laden droplets.

12. The method of claim 11 wherein the entry is ventilated at the working face by blowing air toward the working face between a curtain or tube extending along one side of the entry and said one side of the entry, the curtain or tube terminating short of said face.

13. The method of claim 12 wherein the equipment is operated by remote control from a point in the entry rearward of the end of the curtain.

14. The method of claim 11 wherein the dust is scrubbed from the air by passage through a flooded bed scrubber at a superficial velocity of about 1500–3000 feet per minute.

15. The method of claim 11 wherein the flow of air is from 4500 to 8000 cubic feet per minute.

16. The method of claim 15 wherein the dust is scrubbed from the air by passage through a flooded bed scrubber at a superficial velocity of about 1500–3000 feet per minute.

17. A machine comprising a vehicle; means at one end of the vehicle, constituting its forward end, for operation on material to be removed, the operation of said means being such as to cause dust to be present in the air at said forward end of the vehicle, which dust may include respirable dust comprising particles in the size range below 5 microns; and a dust control system for said machine comprising:

a fan mounted on the vehicle spaced back from the forward end of the machine, said fan having an inlet and an outlet and means for causing a flow of air from the inlet to and out through the outlet;

means on the vehicle forming a passage for induced flow of air from adjacent the forward end of the vehicle where dust is in the air to the inlet of the fan;

a flooded bed scrubber in said passage means for effecting entrainment in droplets of water of dust, including respirable dust in said range, which is in the air flowing through said passage means, said flooded bed scrubber comprising a bed of fibers extending across said passage means through which the air may flow, and means for maintaining the fibers of said bed wetted with water, for entrainment in droplets of water of dust including respirable dust in said range by inertial impaction of the dust on the wetted fibers of the bed on drawing air through the bed at a sufficiently high velocity for said inertial impaction, the fan having the capacity for drawing the air through the bed at such velocity, the dust-laden droplets passing through the bed and downstream from the bed in the air flowing through said passage means;

means in said passage means between the bed and the inlet of the fan for separating the dust-laden droplets of water from the air flowing through said passage means before the droplets reach the fan, said separating means being constructed and arranged for downward flow of the dust-laden droplets;

a drainage system for the dust-laden droplets of water flowing down from said separating means comprising a sump on the vehicle below said separating means for receiving the dust-laden water; and means for disposal of the dust-laden water collected in the sump.

18. A machine as set forth in claim 17 wherein said separating means comprises a plurality of vanes extending generally vertically in said passage means above the sump, said vanes being curved in the direction of the flow of air, forming curved air passageways between the vanes, and having means extending lengthwise thereof and heightwise of said passage means for trapping dust-laden droplets of water from the air as the air flows through the curved air passageways between the vanes, the water with the dust therein flowing down the trapping means of the vanes and flowing down off the lower ends of the vanes and out of said passage means into the sump.

19. A machine as set forth in claim 17 wherein the disposal means is a pump constructed and arranged to pump water with subatmospheric pressure on the water at the inlet of the pump for pumping dust-laden water out of the sump.

20. A machine as set forth in claim 19 wherein a conduit extends from the outlet of the pump to the forward end of the vehicle for delivery of dust-laden water from the sump to the forward end of the vehicle.

21. A machine as set forth in claim 17 wherein the bed of the flooded bed scrubber comprises a plurality of layers of open-mesh material and the means for maintaining the fibers of said bed wetted with water comprises spray nozzles on the upstream side of the bed directed to spray water toward the bed.

22. A machine as set forth in claim 21 wherein the bed comprises a first open frame having a reinforcing screen therein and a second open frame having a reinforcing screen therein, the layers of open mesh material being sandwiched between the screens of the frames and the frames being secured together to hold the layers in place between the screens, the layers being thereby held from bowing out.

23. A machine as set forth in claim 21 wherein the open-mesh material of each of said layers is knitted wire cloth knitted of stainless steel wire of about 3½ mil diameter to a density of about 48, the bed comprising about 40 layers of said cloth.

* * * * *